United States Patent
Nagai et al.

(10) Patent No.: US 9,020,695 B2
(45) Date of Patent: Apr. 28, 2015

(54) IN-VEHICLE DEVICE, CONTROL METHOD THEREOF, AND REMOTE CONTROL SYSTEM

(71) Applicant: Clarion Co., Ltd., Saitama-shi, Saitama (JP)

(72) Inventors: Yasushi Nagai, Yokohama (JP); Atsushi Shimizu, Yokohama (JP); Takashi Matsumoto, Kawasaki (JP); Takayuki Hirota, Saitama (JP); Takashi Yamaguchi, Saitama (JP); Yuji Oohara, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 1 day.

(21) Appl. No.: 13/764,381

(22) Filed: Feb. 11, 2013

(65) Prior Publication Data
US 2013/0261888 A1 Oct. 3, 2013

(30) Foreign Application Priority Data

Mar. 30, 2012 (JP) ................................. 2012-078637

(51) Int. Cl.
| | | |
|---|---|---|
| G06F 7/00 | (2006.01) | |
| G06F 17/00 | (2006.01) | |
| H04W 4/02 | (2009.01) | |
| H04L 29/08 | (2006.01) | |

(52) U.S. Cl.
CPC ............... *G06F 17/00* (2013.01); *H04W 4/027* (2013.01); *H04L 67/12* (2013.01)

(58) Field of Classification Search
USPC .......................................................... 701/36
See application file for complete search history.

(56) References Cited

U.S. PATENT DOCUMENTS

| | | | |
|---|---|---|---|
| 2005/0184860 A1* | 8/2005 | Taruki et al. | 340/441 |
| 2011/0021213 A1* | 1/2011 | Carr | 455/456.4 |
| 2011/0021234 A1* | 1/2011 | Tibbitts et al. | 455/517 |
| 2011/0039581 A1* | 2/2011 | Cai et al. | 455/456.4 |

(Continued)

FOREIGN PATENT DOCUMENTS

| | | |
|---|---|---|
| JP | 2010-044458 A | 2/2010 |
| WO | WO 2011/111306 A1 | 9/2011 |

OTHER PUBLICATIONS

Bose, Raja, et al.; Morphing Smart-phones into Automotive Application Platforms; May 2011; pp. 53-61; IEEE Computer Society.

(Continued)

*Primary Examiner* — Hussein A. Elchanti
(74) *Attorney, Agent, or Firm* — Foley & Lardner LLP

(57) ABSTRACT

An input/output limitation information storage unit stores input/output limitation information in which limitation processing for limiting operation input to the application and display output from the application is prescribed by associating the limitation processing with the application. A determination unit acquires a vehicle state of a vehicle, and determines the limitation processing to be applied to the operation input to the application and the display output from the application on the basis of the application running on the terminal device, the vehicle state, and the input/output limitation information. The limitation unit performs the limitation processing determined by the determination unit for the operation input detected by the input control unit and transmitted to the communication control unit, and the display output received by the communication control unit and transmitted to the output control unit.

4 Claims, 10 Drawing Sheets

(56) References Cited

U.S. PATENT DOCUMENTS

| | | |
|---|---|---|
| 2011/0105097 A1 | 5/2011 | Tadayon et al. |
| 2011/0294520 A1* | 12/2011 | Zhou et al. ............... 455/456.1 |
| 2011/0301839 A1* | 12/2011 | Pudar et al. ................. 701/202 |
| 2011/0307188 A1* | 12/2011 | Peng et al. .................... 702/33 |
| 2012/0052834 A1* | 3/2012 | Riggs et al. ............... 455/404.2 |
| 2012/0071151 A1 | 3/2012 | Abramson et al. |
| 2012/0238286 A1* | 9/2012 | Mallavarapu et al. ..... 455/456.1 |
| 2013/0029654 A1* | 1/2013 | Lesyna ....................... 455/418 |

OTHER PUBLICATIONS

European Patent Office extended search report on application 13154824.0 mailed Jul. 19, 2013; 7 pages.

* cited by examiner

FIG. 4

| PARKING BRAKE STATE | VEHICLE SPEED | DISPLAY LIMITATION PART | OPERATION LIMITATION PART | |
|---|---|---|---|---|
| ON | VEHICLE SPEED = 0 km/h | NONE | NONE | 305 |
| OFF | 0 km/h ≤ VEHICLE SPEED ≤ 30 km/h | DISPLAY PART A | NONE | 306 |
| OFF | 0 km/h < VEHICLE SPEED ≤ 30 km/h | DISPLAY PART B | INPUT PART a | 307 |
| OFF | 20 km/h < VEHICLE SPEED ≤ 30 km/h | DISPLAY PART C | INPUT PART b | 308 |
| OFF | 30 km/h < VEHICLE SPEED ≤ 40 km/h | FULL SCREEN A | ALL INPUT | 309 |
| OFF | 40 km/h < VEHICLE SPEED ≤ 50 km/h | FULL SCREEN B | ALL INPUT | 310 |
| OFF | 50 km/h < VEHICLE SPEED | FULL SCREEN C | ALL INPUT | 311 |

FIG. 5

| PART | LIMITATION REGION | LIMITATION DISPLAY METHOD | SYNTHETIC DATA |
|---|---|---|---|
| DISPLAY PART A | RECTANGULAR REGION (x1, y1) - (x2, y2) | SUPERPOSITION | IMAGE DATA A |
| DISPLAY PART B | RECTANGULAR REGION (x3, y3) - (x4, y4) | SUPERPOSITION | IMAGE DATA B |
| DISPLAY PART B | RECTANGULAR REGION (x5, y5) - (x6, y6) | SUPERPOSITION | GRAY |
| DISPLAY PART C | RECTANGULAR REGION (x7, y7) - (x8, y8) | SUPERPOSITION | GRAY |
| INPUT PART a | RECTANGULAR REGION (x5, y5) - (x6, y6) | NONE | NONE |
| INPUT PART b | RECTANGULAR REGION (x7, y7) - (x8, y8) | NONE | NONE |
| INPUT PART b | SELECTION KEY | NONE | NONE |
| FULL SCREEN A | FULL SCREEN REGION | REDUCED SIZE 1/5 DISPLAY | IN-VEHICLE DEVICE SCREEN FOR REDUCED SIZE 1/5 AND MOBILE PHONE SCREEN FOR REDUCED SIZE 1/5 |
| FULL SCREEN B | FULL SCREEN REGION | ICON DISPLAY | IN-VEHICLE DEVICE SCREEN FOR ICON AND ICON DATA |
| FULL SCREEN C | FULL SCREEN REGION | IN-VEHICLE DEVICE SCREEN DISPLAY | IN-VEHICLE DEVICE SCREEN |
| ALL INPUT | FULL SCREEN REGION AND ALL KEYS | NONE | NONE |

FIG. 7

| PARKING BRAKE STATE ⎡301 | VEHICLE SPEED ⎡302 | DISPLAY LIMITATION PART ⎡303 | OPERATION LIMITATION PART ⎡304 |
|---|---|---|---|
| ON | VEHICLE SPEED = 0 km/h | NONE | NONE |
| OFF | VEHICLE SPEED = 0 km/h | FULL SCREEN B | ALL INPUT |
| OFF | 0 km/h < VEHICLE SPEED | FULL SCREEN C | ALL INPUT |

| PART ⎡401 | LIMITATION REGION ⎡402 | LIMITATION DISPLAY METHOD ⎡403 | SYNTHETIC DATA ⎡404 |
|---|---|---|---|
| FULL SCREEN B | FULL SCREEN REGION | ICON DISPLAY | IN-VEHICLE DEVICE SCREEN FOR ICON AND ICON DATA |
| FULL SCREEN C | FULL SCREEN REGION | IN-VEHICLE DEVICE SCREEN DISPLAY | IN-VEHICLE DEVICE SCREEN |
| ALL INPUT | FULL SCREEN REGION AND ALL KEYS | NONE | NONE |

| IN-VEHICLE DEVICE MODEL ID ⟋801 | MOBILE PHONE APP ID ⟋802 | INPUT/OUTPUT LIMITATION INFORMATION ⟋803 | |
|---|---|---|---|
| IN-VEHICLE DEVICE A | MOBILE PHONE APP a | INPUT/OUTPUT LIMITATION INFORMATION Aa | 804 |
| IN-VEHICLE DEVICE A | MOBILE PHONE APP b | INPUT/OUTPUT LIMITATION INFORMATION Ab | 805 |
| IN-VEHICLE DEVICE B | MOBILE PHONE APP a | INPUT/OUTPUT LIMITATION INFORMATION Ba | 806 |
| IN-VEHICLE DEVICE B | MOBILE PHONE APP b | INPUT/OUTPUT LIMITATION INFORMATION Bb | 807 |

IN-VEHICLE DEVICE, CONTROL METHOD THEREOF, AND REMOTE CONTROL SYSTEM

This application is based upon and claims the benefit of priority from Japanese Patent Application No. 2012-078637 filed on Mar. 30, 2012, the content of which is incorporated by reference.

BACKGROUND OF THE INVENTION

1. Field of the Invention

The present invention relates to an in-vehicle device that is installed in a vehicle, and provides a driver with various service functions, and a control method thereof.

2. Description of the Related Art

In-vehicle devices (car navigation devices, air conditioner operation devices, car audio devices, back monitor devices, and the like) that are installed in vehicles, provide drivers with various information associated with map information or maps in the vehicles, and provide the drivers with various service functions such as navigation to a destination, operation of an air conditioner, a radio, or a music player, image display of an in-vehicle camera are generally utilized. Recently, mobile phones (smart phones) developed based on personal computers and having high functionality are utilized. It is becoming possible for the mobile phones to provide users with services equivalent to those of the in-vehicle devices. For example, it is becoming possible that the in-vehicle device and the mobile phone are connected in a wired or wireless manner, and a screen of an application of the mobile phone is displayed on the in-vehicle device, or a user operates the in-vehicle device to control the application on the mobile phone.

In the abstract of Japanese Patent Application Laid-open No. 2010-44458, a remote-control system that controls a remote-control target terminal from a control instruction terminal is disclosed. By utilizing the technique disclosed in Japanese Patent Application Laid-open No. 2010-44458, it becomes possible to utilize an application of a mobile phone (remote-control target terminal) with a large screen of an in-vehicle device (control instruction terminal) suitable for utilization in a vehicle. Additionally, it becomes also possible to integrate screens of various terminal devices such as the mobile phone and to display the screens on the in-vehicle device, for example.

Generally, since the in-vehicle device is mounted on the vehicle, and integrated with the vehicle, a frequency of update of internal data or a program is low. For example, the internal data or the program of the in-vehicle device is not relatively frequently updated, and is often continued to be used for a long period of time, such as seven to ten years. Although the program of the in-vehicle device can be updated at an automobile dealer, a user needs to bring the vehicle with the in-vehicle device installed therein all the way into the dealer, which is troublesome.

As compared with this, the mobile phone is often replaced around every two years, and an old mobile phone is not often continued to be used over a long period of time. Additionally, since the mobile phone with high functionality is often always connected to a network, and easily updated by acquiring information or a program from a server, the mobile phone is often maintained in a state where new information and new functions can be always utilized.

If an application of a mobile phone can be utilized from an in-vehicle device, it is convenient because a large screen can be used. However, there are the following problems.

A driver needs to direct his attention to the front of a vehicle at every moment while the vehicle is moving, and has to avoid watching of the screen of the in-vehicle device for a long time. Particularly, in a case where the vehicle moves at a high speed, since a moving distance of the vehicle for a constant time is long, and a visual field of the driver becomes narrow, it is extremely dangerous that the driver removes his gaze from the view of the front of the vehicle for a long time.

However, general applications of the mobile phone, which are designed for general purposes without assuming utilization of the driver during driving, may not be adequate to be utilized with the in-vehicle device by the driver. Therefore, in a case where the applications of the mobile phone are utilized with the in-vehicle device, a screen is difficult to be visually recognized, or the applications are difficult to be operated, and hence the time for removing the driver's gaze from the view of the front of the vehicle may tend to be increased.

Particularly, for example, when a screen including operation buttons, small characters, moving images, and the like, at which a user tends to fixedly look, is displayed on the in-vehicle device, the attention of the driver directs to the in-vehicle device, and attentiveness to the outside world tends to be decreased. Additionally, also in a case where operation is required a plurality of times until the application is changed to a desired state, the attention of the driver directs to the in-vehicle device, and attentiveness to the outside world tends to be decreased.

SUMMARY OF THE INVENTION

An object of the present invention is to provide a technique enabling limitation of display or operation for safely utilizing, on an in-vehicle device, an application on a terminal device, in a case of utilization of the application on the in-vehicle device.

An in-vehicle device according to an aspect of the present invention is an in-vehicle device installed in a vehicle, connected to a terminal device, and enabling operation and display of an application running on the terminal device, the in-vehicle device having an input control unit detecting operation input, an output control unit controlling display output, a communication control unit receiving display output from the terminal device connected, and transmitting operation input to the terminal device, an input/output limitation information storage unit storing input/output limitation information in which limitation processing for limiting operation input to the application and display output from the application is prescribed by associating the limitation processing with the application, a determination unit acquiring a vehicle state of the vehicle, and determining the limitation processing to be applied to the operation input to the application and the display output from the application on the basis of the application running on the terminal device, the vehicle state, and the input/output limitation information, and a limitation unit performing the limitation processing determined by the determination unit for the operation input detected by the input control unit and transmitted to the communication control unit, and the display output received by the communication control unit and transmitted to the output control unit.

The present invention enables limitation of display or operation for safe utilization on the in-vehicle device in a case where the application on the terminal device is utilized on the in-vehicle device.

The above and other objects, features, and advantages of the present invention will become apparent from the following description with references to the accompanying drawings which illustrate examples of the present invention.

BRIEF DESCRIPTION OF THE DRAWINGS

FIG. 4 is a figure showing a table of limitation condition information;

FIG. 5 is a figure showing a table of limitation method information;

FIG. 7 is a figure showing an example of a table for managing limitation conditions of display and operation according to a predetermined vehicle state;

FIG. 8 is a figure showing a configuration of a table for managing limitation parts of predetermined display and operation, and a limitation method;

FIG. 9 is a figure showing an example of a table configuration managing input/output limitation information delivered from a server;

DESCRIPTION OF THE PREFERRED EMBODIMENTS

Basic embodiment of the present invention will be now described.

Figure 1:
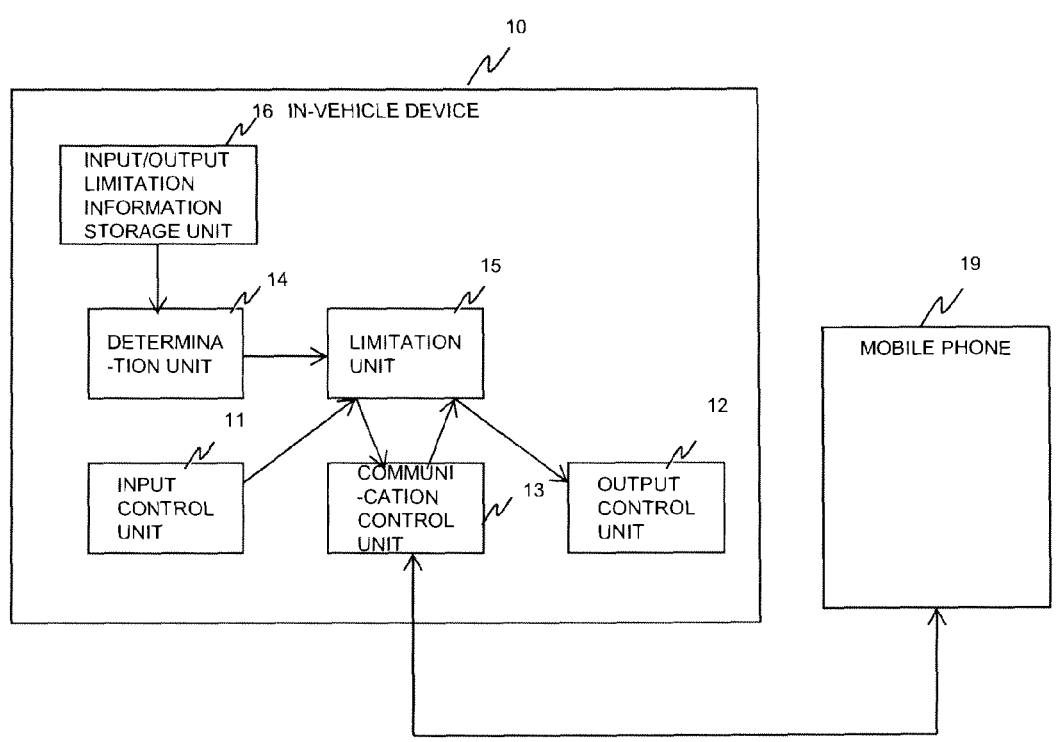
FIG. 1 is a block diagram showing a remote control system according to the present embodiment.

FIG. 1 is a block diagram showing a remote control system according to the present embodiment. The remote control system according to the present embodiment has an in-vehicle device 10 and a mobile phone 19.

The mobile phone 19 is a highly functional mobile phone terminal that runs an application and provides a user with a service function.

The in-vehicle device 10 is a device such as a navigation device, an air conditioner operation device, a car audio device, and a back monitor device, which is installed in a vehicle such as an automobile, is connected to the mobile phone 19 in a wired or wireless manner, and is capable of operating and displaying the application running on the mobile phone 19.

The in-vehicle device 10 has an input control unit 11, an output control unit 12, a communication control unit 13, a determination unit 14, a limitation unit 15, and an input/output limitation information storage unit 16.

The input control unit 11 detects operation input by touch operation to a touch panel or pressing of an operation button.

The output control unit 12 controls display output of an application screen to a liquid crystal display or the like.

The communication control unit 13 is connected to the mobile phone 19, receives display output from the mobile phone 19, and transmits operation input to the mobile phone 19.

The input/output limitation information storage unit 16 stores input/output limitation information, in which limitation processing to input/output to the application, which is running on the mobile phone 19, by the in-vehicle device 10 is prescribed by association with the application.

While the applications running on the mobile phone 19 are basically designed on the assumption of display and operation with the mobile phone 19, in the remote control system according to the present embodiment, the applications are displayed and operated with the in-vehicle device 10. The in-vehicle device 10 generally has a larger screen than that of the mobile phone 19, and therefore is convenient as long as the user does not drive and only utilizes the application.

However, it is dangerous that the user operates the in-vehicle device 10 while driving a vehicle. According to the present embodiment, at least a part of the applications is applied to the limitation processing associated with the application, and the application screen is not displayed on the in-vehicle device 10, or operation from the in-vehicle device 10 is not accepted. For example, while the vehicle is moving, video contents are not displayed on the in-vehicle device 10, or operation buttons become inactivated.

The input/output limitation information includes first input/output limitation information, in which the limitation processing with respect to a combination of the application and the in-vehicle device 10 is prescribed, and second input/output limitation information to be applied to the combination of the application and the in-vehicle device 10, which is not prescribed in the first input/output limitation information.

In the first input/output limitation information, such limitation processing as not to limit operation or display as much as possible while ensuring safety of driving, and as to enhance convenience is prescribed as dedicated information with respect to the combination of the application and the in-vehicle device 10. On the other hand, the second input/output limitation information is applied to the combination of the application and the in-vehicle device 10, which is not prescribed in the first input/output limitation information, for general purposes, and therefore such limitation processing as to ensure safety with respect to various combinations even when operation or display is strictly limited is prescribed.

The determination unit 14 acquires a vehicle state of the vehicle, and determines limitation processing, which is applied to operation input to the application and display output from the application, on the basis of the application running on the mobile phone 19, the vehicle state, and the input/output limitation information.

At this time, when the combination of the application running on the mobile phone 19 and the in-vehicle device 10 itself is prescribed in the first input/output limitation information, the determination unit 14 determines the limitation processing to the application on the basis of the first input/output limitation information. When the combination of the application and the in-vehicle device 10 itself is not prescribed in the first input/output limitation information, the determination unit 14 determines the limitation processing to the application on the basis of the second input/output limitation information.

The limitation unit 15 performs the limitation processing determined by the determination unit 14 for operation input detected by the input control unit 11 and transmitted to the communication control unit 13, and display output received by the communication control unit 13 and transmitted to the output control unit 12.

According to the present embodiment, display or operation can be limited so as to be suitable for utilization in the in-vehicle device 10 in a case where various applications for the mobile phone are utilized with the in-vehicle device 10.

Furthermore, according to the present embodiment, when the communication control unit 13 is connected to the mobile phone 19, the communication control unit 13 notifies the mobile phone 19 of identification information identifying a model of the in-vehicle device 10 itself, acquires, from the mobile phone 19, first input/output limitation information corresponding to the combination of the application running on the mobile phone 19 and the in-vehicle device, and records the same in the input/output limitation information storage unit 16.

At this time, when the mobile phone 19 holds the first input/output limitation information for the combination of the application running on the mobile phone 19 itself and the in-vehicle device 10 by itself, the mobile phone 19 transmits the same to the in-vehicle device 10. When the mobile phone 19 does not hold the first input/output limitation information for the combination of the application running on the mobile phone 19 itself and the in-vehicle device 10 by itself, the mobile phone 19 acquires the same from a server (not shown), and notifies the in-vehicle device 10 of the same. According to this, even when the application on the mobile phone 19 is not updated, limitation information for a new combination of the application and the in-vehicle device 10 can be notified to the in-vehicle device 10 even afterwards.

According to the present embodiment, while an example of displaying and operating the application running on the mobile phone with the in-vehicle device 10 is shown, a terminal device connected to the in-vehicle device 10 in the present invention may not be the mobile phone. As the terminal device connected to the in-vehicle device 10, any information processing device including a communication interface may be employed. As another example, a personal computer or a game machine having a wireless LAN interface or a USB interface may be employed.

Examples of the vehicle according to the present embodiment widely include vehicles for movement such as automobiles, motorcycles, and bicycles.

Practical Example

Hereinafter, a practical example will be described with reference to the figures.

Figure 2:
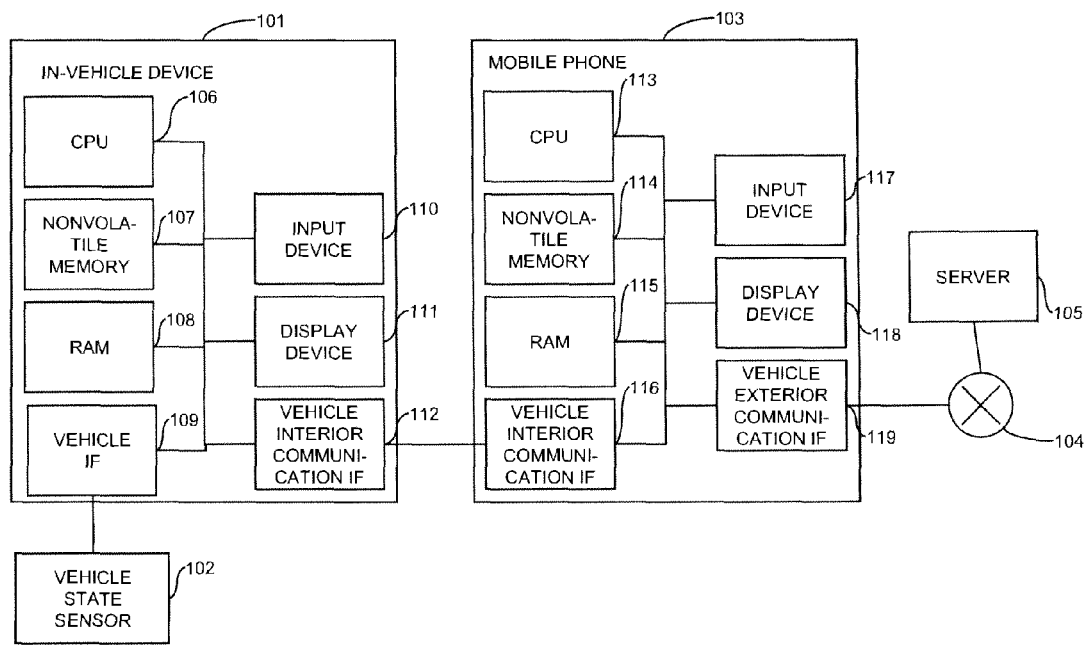
FIG. 2 is a figure illustrating a hardware configuration of a remote control system according to an in-vehicle device of the present practical example.

FIG. 2 is a figure illustrating a hardware configuration of a remote control system of an in-vehicle device of the present practical example. The remote control system of the in-vehicle device includes the in-vehicle device, a vehicle state sensor, a mobile phone, a network, and a server.

In this figure, reference numeral 101 denotes the in-vehicle device, reference numeral 102 denotes the vehicle state sensor, reference numeral 103 denotes the mobile phone, reference numeral 104 denotes the network, the reference numeral 105 denotes the server, reference numeral 106 denotes a central processing unit (CPU), reference numeral 107 denotes a nonvolatile memory, reference numeral 108 denotes a random access memory (RAM), reference numeral 109 denotes a vehicle interface (IF), reference numeral 110 denotes an input device, reference numeral 111 denotes a display device, reference numeral 112 denotes a vehicle interior communication IF, reference numeral 113 denotes a CPU, reference numeral 114 denotes a nonvolatile memory, reference numeral 115 denotes a RAM, reference numeral 116 denotes a vehicle interior communication IF, reference numeral 117 denotes an input device, reference numeral 118 denotes a display device, and reference numeral 119 denotes a vehicle exterior communication IF.

The in-vehicle device 101 includes the CPU 106, the nonvolatile memory 107, the RAM 108, the vehicle IF 109, the input device 110, the display device 111, and the vehicle interior communication IF 112.

The CPU 106 runs a program stored in the nonvolatile memory 107 by utilizing the RAM 108 as a working memory. The nonvolatile memory 107 stores a program of the in-vehicle device run by the CPU 106. The RAM 108 is a memory utilized for work by the CPU 106. The vehicle IF 109 is an interface for acquiring a state of a parking brake, a state of a brake, and a state of the vehicle such as vehicle speed, acceleration, latitude and longitude by the vehicle state sensor 102. The input device 110 is an input device such as a key, a dial, and a touch panel. The display device 111 is a display device such as a liquid crystal display, displaying a program running result by the CPU 106. The vehicle interior communication IF 112 is a wired or wireless communication interface, and can be connected to a mobile phone or a personal computer.

The vehicle state sensor 102 is various sensors acquiring the state of the parking brake, the state of the brake, the vehicle speed, the acceleration, the latitude, and the longitude. While an example, in which the vehicle state sensor 102 is outside the in-vehicle device 101, is shown here, the vehicle state sensor 102 may be inside the in-vehicle device 101.

The mobile phone 103 includes the CPU 113, the nonvolatile memory 114, the RAM 115, the vehicle interior communication IF 116, the input device 117, the display device 118, and the vehicle exterior communication IF 119.

The CPU 113 runs a program stored in the nonvolatile memory 114 by utilizing the RAM 115 as a working memory. The nonvolatile memory 114 stores a program of the mobile phone run by the CPU 113. The RAM 115 is a memory utilized for work by the CPU 113. The vehicle interior communication IF 116 is a wired or wireless communication interface, and can be connected to the in-vehicle device, or the personal computer. The input device 117 is an input device such as a key, a dial, and a touch panel. The display device 118 is a display device such as a liquid crystal display, displaying a program running result by the CPU 113. The vehicle exterior communication IF 119 is a communication interface configured such that the mobile phone 103 can be connected to the server 105 through the network 104.

The in-vehicle device 101 remote-controls the mobile phone 103 through the vehicle interior communication IF 112. The mobile phone 103 runs an application program in accordance with operation of the in-vehicle device 101 through the vehicle interior communication IF 116, and displays the result on the display device 111 of the in-vehicle device 101. Then, the in-vehicle device 101 acquires the vehicle state such as the parking brake and the vehicle speed with the vehicle state sensor 102, and performs limitation of display and limitation of transmission of the operation of the in-vehicle device 101 to the mobile phone 103 according to the vehicle state in accordance with input/output limitation information stored in the nonvolatile memory 107.

Thus, allowable operation or display contents of general-purpose applications of the mobile phone can be limited depending on the vehicle state such as the vehicle speed.

The mobile phone 103 can hold the input/output limitation information inherent in the application. In this case, before start of remote control of the mobile phone 103 by the in-vehicle device 101, the mobile phone 103 transmits the input/output limitation information inherent in the application to the in-vehicle device 101 through the vehicle interior communication IF 112. Then, the in-vehicle device 101 performs the limitation of the display of a moving image or small characters, and the limitation of transmission of the operation of the in-vehicle device 101 to the mobile phone 103, in accordance with the received input/output limitation information inherent in the application and the vehicle state acquired by the vehicle state sensor 102.

Thus, even the application of the mobile phone 103 produced after production of the in-vehicle device 101 can perform limitation of display of a moving image or small characters inherent in the application or limitation of operation of a button or an input form displayed on the screen.

The mobile phone 103 is connected to the server 105 through the network 104. The mobile phone 103 transmits, to the server 105, in-vehicle device model identification information received from the in-vehicle device 101 (the identification information is hereinafter referred to as an ID), and an ID (mobile phone app ID) of an application program to be run, and downloads, from the server 105, the input/output limitation information required for the limitation of the remote control of the application program of the mobile phone 103 by the in-vehicle device 101, and passes the same to the in-vehicle device 101. Then, the in-vehicle device 101 performs the limitation of the display of the moving image or the small characters, and the limitation of the transmission of the operation of the in-vehicle device 101 to the mobile phone 103, in accordance with the received input/output limitation information and the vehicle state acquired by the vehicle state sensor 102.

Thus, even the in-vehicle device 101 produced after development of the application of the mobile phone 103 can perform the limitation of the display of the moving image or the small characters inherent in the application or the limitation of the operation of the button or the input form displayed on the screen.

Figure 3:
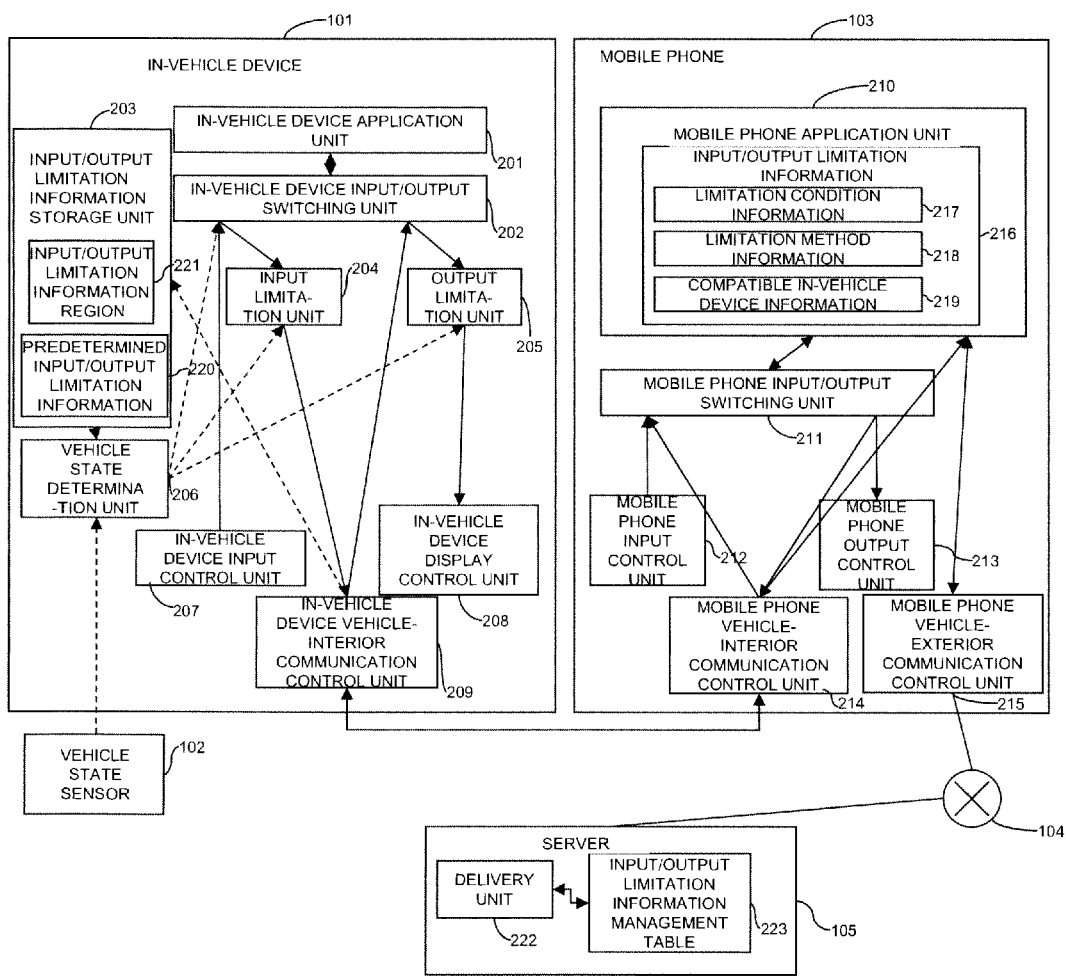
FIG. 3 is a function configuration diagram of the remote control system according to the in-vehicle device of the present practical example.

FIG. 3 is a function configuration diagram of the remote control system of the in-vehicle device of the present practical example.

In this figure, in the remote control system of the in-vehicle device in FIG. 2, configurations denoted by the same reference numerals as those shown in FIG. 2 already described, and portions having the same functions are not repeatedly described.

In the in-vehicle device 101, reference numeral 201 denotes an in-vehicle device application unit, reference numeral 202 denotes an in-vehicle device input/output switching unit, reference numeral 203 denotes an input/output limitation information storage unit, reference numeral 204 denotes an input limitation unit, reference numeral 205 denotes an output limitation unit, reference numeral 206 denotes a vehicle state determination unit, reference numeral 207 denotes an in-vehicle device input control unit, reference numeral 208 denotes an in-vehicle device display control unit, and reference numeral 209 denotes an in-vehicle device vehicle-interior communication control unit. These processing units are embodied by utilizing the RAM 108 as the working memory and running the program stored in the nonvolatile memory 107 with the CPU 106.

The in-vehicle device 101 according to the present practical example differs from conventional devices in that the in-vehicle device 101 includes the input/output limitation information storage unit 203, the input limitation unit 204, the output limitation unit 205, and the vehicle state determination unit 206.

In the input/output limitation information storage unit 203, reference numeral 220 denotes predetermined input/output limitation information, and reference numeral 221 denotes an input/output limitation information region.

In the mobile phone 103, reference numeral 210 denotes a mobile phone application unit, reference numeral 211 denotes a mobile phone input/output switching unit, reference numeral 212 denotes a mobile phone input control unit, reference numeral 213 denotes a mobile phone output control unit, reference numeral 214 denotes a mobile phone vehicle-interior communication control unit, and reference numeral 215 denotes a mobile phone vehicle-exterior communication control unit. These processing units are embodied by utilizing the RAM 115 as the working memory and running the program stored in the nonvolatile memory 114 with the CPU 113.

The mobile phone 103 according to the present practical example differs from conventional devices in that the mobile phone application unit 210 includes the input/output limitation information 216. In the input/output limitation information 216, reference numeral 217 denotes limitation condition information, reference numeral 218 denotes limitation method information, and reference numeral 219 denotes compatible in-vehicle device information.

In the server 105, reference numeral 222 denotes a delivery unit, and reference numeral 223 denotes an input/output limitation information management table. The delivery unit 222 is embodied by utilizing a RAM (not shown) of the server as the working memory and running a program stored in a nonvolatile memory (not shown) of the server with a CPU (not shown) of the server.

The input/output limitation information 216 is limitation information in which limitation contents of display and operation according to the vehicle state are prescribed, and is configured from the limitation condition information 217, the limitation method information 218, and the compatible in-vehicle device information 219.

The limitation condition information 217 is a table illustrated in FIG. 4, and a part where display on the screen is limited (display limitation part), a method of limitation thereof, and a part where operation is limited (operation limitation part) can be specified from the parking brake state and the vehicle speed obtained from the vehicle state sensor 102.

The limitation method information 218 is a table illustrated in FIG. 5, and as to each display limitation part and each operation limitation part identified in the table of the FIG. 4, a limited region, a display method in a limited state, and synthetic data utilized for the display can be specified.

The compatible in-vehicle device information 219 is a list of an in-vehicle device model ID identifying the model of the in-vehicle device 101 capable of utilizing the limitation condition information 217 and the limitation method information 218.

The predetermined input/output limitation information 220 is information having the same configuration as that of the input/output limitation information 216 previously stored by the in-vehicle device 101, and is utilized in a case where the input/output limitation information 216 is not obtained from the mobile phone 103 or the server 105. The predetermined input/output limitation information 220 is configured from limitation condition information defined by a table illustrated in FIG. 7, and limitation method information defined by a table illustrated in FIG. 8.

The input/output limitation information region 221 is a region where the predetermined input/output limitation information 220 or the input/output limitation information 216 sent from the mobile phone 103 or the server 105 is stored, and the in-vehicle device 101 limits display of an image sent from the mobile phone, and information of operation by a user, which is sent from the in-vehicle device to the mobile phone, in accordance with the input/output limitation information stored in this region.

The in-vehicle device application unit 201 receives input information from the in-vehicle device input/output switching unit 202, and outputs display and the like through the in-vehicle device input/output switching unit 202.

The in-vehicle device input/output switching unit 202 is controlled by the vehicle state determination unit 206, and selects whether information received from the in-vehicle device input control unit 207 is passed to the mobile phone 103 through the input limitation unit 204 and the in-vehicle device vehicle-interior communication control unit 209 or to the in-vehicle device application unit 201.

The in-vehicle device input/output switching unit 202 alternatively switches between display of an image from the in-vehicle device application unit 201 and display of an image of the mobile phone 103 received through the output limitation unit 205 and the in-vehicle device vehicle-interior communication control unit 209, or displays an image synthesizing the image of the in-vehicle device application unit 201 and the image of the mobile phone 103.

For example, it is considered that when the image of the mobile phone 103 is displayed, information received from the in-vehicle device input control unit 207 is passed to the mobile phone 103, and when the image from the in-vehicle device application unit 201 is displayed, information from the in-vehicle device input control unit 207 is passed to the in-vehicle device application unit 201.

The in-vehicle device input control unit 207 controls to pass, to the in-vehicle device input/output switching unit 202, input data received from the input device 110, the information received from the vehicle state sensor 102 through the vehicle IF 109, or the information such as a map held in the in-vehicle device 101.

The in-vehicle device display control unit 208 controls to display data received from the output limitation unit 205 on the display device 111.

The in-vehicle device vehicle-interior communication control unit 209 passes display data received from the mobile phone 103 to the in-vehicle device input/output switching unit 202, passes input data received from the input limitation unit 204 to the mobile phone 103, and records the input/output limitation information 216 received from the mobile phone 103 in the input/output limitation information storage unit 203.

The input/output limitation information storage unit 203 previously stores the predetermined input/output limitation information 220, and stores, in the input/output limitation information region 221, the input/output limitation information 216 sent from the mobile phone 103 or the server 105 through the vehicle interior communication IF 112.

The predetermined input/output limitation information 220 is information having the same format as the input/output limitation information 216, and defines existence or nonexistence of limitation with respect to operation and display of a full screen so as to be capable of corresponding to various applications of various mobile phones.

In a case where the input/output limitation information 216 is sent from the mobile phone 103 or the server 105 through the vehicle interior communication IF 112, the input/output limitation information region 221 stores the received input/output limitation information 216. In a case where the input/output limitation information 216 is not received, the input/output limitation information region 221 stores the predetermined input/output limitation information 220.

The input limitation unit 204 controls whether or not input sent from the input device 110 of the in-vehicle device 101 through the in-vehicle device input control unit 207 and the in-vehicle device input/output switching unit 202 is sent to the mobile phone 103 through the in-vehicle device vehicle-interior communication control unit 209 in accordance with the instruction of the vehicle state determination unit 206.

The output limitation unit 205 processes display contents, which are received from the mobile phone 103 through the in-vehicle device vehicle-interior communication control unit 209 and the in-vehicle device input/output switching unit 202, to display contents with limitation in accordance with the instruction of the vehicle state determination unit 206, and displays the display contents with limitation on the display device 111 of the in-vehicle device 101 through the in-vehicle device display control unit 208.

The vehicle state determination unit 206 acquires the vehicle state such as the parking brake, the brake, the vehicle speed, the acceleration, the latitude and the longitude from the vehicle state sensor 102, determines a limitation method and a limitation region of input/output in accordance with the input/output limitation information 216 or the predetermined input/output limitation information 220 stored in the input/output limitation information region 221 of the input/output limitation information storage unit 203, and instructs the input limitation unit 204, the output limitation unit 205, and the in-vehicle device input/output switching unit 202 on the limitation method and the limitation region.

The mobile phone application unit 210 receives input information from the mobile phone input/output switching unit 211, performs processing according to the service function of the application, and outputs an image and the like through the mobile phone input/output switching unit 211. When the in-vehicle device 101 and the mobile phone 103 are connected to each other, the mobile phone application unit 210 performs communication between the vehicle interior communication IF 116 of the mobile phone 103 and the vehicle interior communication IF 112 of the in-vehicle device 101 through the mobile phone input/output switching unit 211 and the mobile phone vehicle-interior communication control unit 214, and passes the input/output limitation information 216 to the in-vehicle device 101.

The mobile phone input/output switching unit 211 passes, to the mobile phone application unit 210, information received from the mobile phone input control unit 212, or input information of the in-vehicle device 101 received through the mobile phone vehicle-interior communication control unit 214.

The mobile phone input control unit 212 controls to pass, to the mobile phone input/output switching unit 211, data received from the input device 117 of the mobile phone 103.

The mobile phone output control unit 213 controls to display data received from the mobile phone input/output switching unit 211 on the display device 118 of the mobile phone 103.

The mobile phone vehicle-interior communication control unit 214 is connected to the vehicle interior communication IF 112 of the in-vehicle device 101 through the vehicle interior communication IF 116 of the mobile phone 103, and controls to transmit/receive data of the in-vehicle device vehicle-interior communication control unit 209.

The mobile phone vehicle-exterior communication control unit 215 controls the vehicle exterior communication IF 119 of the mobile phone 103 in accordance with the instruction of the mobile phone application unit 210, and controls communication with the server 105 through the network 104.

The delivery unit 222 of the server 105 specifies input/output limitation information suitable for a combination of the in-vehicle device 101 instructing operation remotely and the mobile phone 103 receiving and performing the remote operation in reference to the input/output limitation information management table 223 from the in-vehicle device model ID and the mobile phone app ID received from the mobile phone 103, and passes the same to the mobile phone 103.

The input/output limitation information management table 223 is a table illustrated in FIG. 9, and the input/output limitation information suitable for the combination is stored for each combination of the in-vehicle device model ID and the mobile phone app ID.

FIG. 4 is a figure showing a table of the limitation condition information. This is a table for managing the display limitation part and the operation limitation part on the screen for each state of the vehicle installed with in-vehicle device 101 therein. In this example, as the state of the vehicle, the parking brake state and the vehicle speed are utilized.

In a "parking brake state" 301, the parking brake state acquired by the vehicle state sensor 102 is listed.

In a "vehicle speed" 302, the vehicle speed acquired by the vehicle state sensor 102 is listed.

In a "display limitation part" 303, the ID of the display limitation part is listed.

In an "operation limitation part" 304, the ID of the operation limitation part is listed.

On a line 305, it is described that in a case where the "parking brake state" is "ON", and the "vehicle speed" is "vehicle speed=0 km/h", the "display limitation part" is "none", and the "operation limitation part" is "none". On a line 306, it is described that in a case where the "parking brake state" is "OFF", and the "vehicle speed" is "0 km/h≤vehicle speed≤30 km/h", the "display limitation part" is a "display part A", and the "operation limitation part" is "none". On a line 307, it is described that in a case where the "parking brake state" is "OFF", and the "vehicle speed" is "0 km/h<vehicle speed≤30 km/h", the "display limitation part" is a "display part B", and the "operation limitation part" is an "input part a". On a line 308, it is described that in a case where the "parking brake state" is "OFF", and the "vehicle speed" is "20 km/h<vehicle speed≤30 km/h", the "display limitation part" is a "display part C", and the "operation limitation part" is an "input part b". On a line 309, it is described that in a case where the "parking brake state" is "OFF", and the "vehicle speed" is "30 km/h<vehicle speed≤40 km/h", the "display limitation part" is a "full screen A", and the "operation limitation part" is "all input". On a line 310, it is described that in a case where the "parking brake state" is "OFF", and the "vehicle speed" is "40 km/h<vehicle speed≤50 km/h", the "display limitation part" is a "full screen B", the "operation limitation part" is "all input". On a line 311, it is described that in a case where the "parking brake state" is "OFF", and the "vehicle speed" is "50 km/h<vehicle speed", the "display limitation part" is a "full screen C", and the "operation limitation part" is "all input".

The vehicle state determination unit 206 receives this table from the input/output limitation information region 221 of the input/output limitation information storage unit 203. Furthermore, the vehicle state determination unit 206 compares the "parking brake state" and the "vehicle speed" received from the vehicle state sensor 102 with conditions of the "parking brake state" and the "vehicle speed" of each line of this table, and extracts the "display limitation part" and the "operation limitation part" of a line meeting the conditions of the vehicle state.

For example, in a case where the "parking brake state" is "ON", and the "vehicle speed" is "vehicle speed=0 km/h", the vehicle states meet only the conditions of the line 305. Therefore, the vehicle state determination unit 206 extracts the information that the "display limitation part" is "none", and the "operation limitation part" is "none".

In a case where the "parking brake state" is "OFF", and the "vehicle speed" is "vehicle speed=0 km/h", the vehicle states meet only the conditions of the line 306. Therefore, the information that the "display limitation part" is the "display part A", and the "operation limitation part" is "none" is extracted.

In a case where the "parking brake state" is "OFF", and the "vehicle speed" is "0 km/h<vehicle speed=20 km/h", the vehicle states meet the conditions of the line 306 and the line 307, and the information that the "display limitation part" is the "display part A" and the "display part B", and the "operation limitation part" is "none" and the "input part a" is extracted.

In a case where the "parking brake state" is "OFF", and the "vehicle speed" is "20 km/h<vehicle speed=30 km/h", the vehicle states meet the conditions of the line 306, and the line 307 and the line 308, the information that the "display limitation part" is the "display part A", the "display part B" and the "display part C", and the "operation limitation part" is "none", the "input part a" and the "input part b" is extracted.

In a case where the "parking brake state" is "OFF", and the "vehicle speed" is "30 km/h<vehicle speed=40 km/h", the vehicle states meet only the conditions of the line 309, and the information that the "display limitation part" is the "full screen A", and the "operation limitation part" is "all input" is extracted.

In a case where the "parking brake state" is "OFF", and the "vehicle speed" is "40 km/h<vehicle speed=50 km/h", the vehicle states meet only the conditions of the line 310, and the information that the "display limitation part" is the "full screen B", and the "operation limitation part" is "all input" is extracted.

In a case where the "parking brake state" is "OFF", and the "vehicle speed" is "50 km/h<vehicle speed", the vehicle states meet only the conditions of the line 311, and the information that the "display limitation part" is the "full screen C", and the "operation limitation part" is "all input" is extracted.

FIG. 5 is a figure showing a table of the limitation method information. This is a table for managing a limitation display method and a limitation region of display and operation, designated by the "display limitation part" 303 or the "operation limitation part" 304 of the limitation condition information table. In this example, while a case where the screen configuration of the application of the mobile phone is not changed is covered, the limitation display method and the limitation region may be defined for each screen configuration in a case where the screen configuration is changed.

In a "part" 401, an ID of the "display limitation part" 303 or the "operation limitation part" 304 of the limitation condition information table is listed.

In a "limitation region" 402, a region or a part limiting display or operation corresponding to the ID of the "display limitation part" or the "operation limitation part" is listed.

In a "limitation display method" 403, a method of limiting display is listed.

In a "synthetic data" 404, data utilized for the limitation of display is listed.

On a line 405, it is described that in a case where the selected "part" is the "display part A", the "limitation region" is a "rectangular region (x1, y1)-(x2, y2)", and the "limitation display method" is "superposition", and the "synthetic data" is "image data A".

On a line 406, it is described that in a case where the selected "part" is the "display part B", the "limitation region" is a "rectangular region (x3, y3)-(x4, y4)", the "limitation display method" is "superposition", and the "synthetic data" is "image data B".

On a line 407, it is described that in a case where the selected "part" is the "display part B", the "limitation region" is a "rectangular region (x5, y5)-(x6, y6)", the "limitation display method" is "superposition", and the "synthetic data" is "gray".

On a line 408, it is described that in a case where the selected "part" is the "display part C", the "limitation region" is a "rectangular region (x7, y7)-(x8, y8)", the "limitation display method" is "superposition", and the "synthetic data" is "gray".

On a line 409, it is described that in a case where the selected "part" is the "input part a", the "limitation region" is a "rectangular region (x5, y5)-(x6, y6)", the "limitation display method" is "none", and the "synthetic data" is "none".

On a line 410, it is described that in a case where the selected "part" is the "input part b", the "limitation region" is a "rectangular region (x7, y7)-(x8, y8)", the "limitation display method" is "none", and the "synthetic data" is "none".

On a line 411, it is described that in a case where the selected "part" is the "input part b", the "limitation region" is a "selection key", the "limitation display method" is "none", and the "synthetic data" is "none".

On a line 412, it is described that in a case where the selected "part" is the "full screen A", the "limitation region" is a "full screen region", the "limitation display method" is "reduced size ⅕ display", and the "synthetic data" is an "in-vehicle device screen for reduced size ⅕ and mobile phone screen for reduced size ⅕".

On a line 413, it is described that in a case where the selected "part" is the "full screen B", the "limitation region" is a "full screen region", the "limitation display method" is "icon display", and the "synthetic data" is an "in-vehicle device screen for icon and icon data".

On a line 414, it is described that in a case where the selected "part" is the "full screen C", the "limitation region" is the "full screen region", the "limitation display method" is "in-vehicle device screen display", and the "synthetic data" is an "in-vehicle device screen".

On a line 415, it is described that in a case where the selected "part" is "all input", the "limitation region" is a "full screen region and all keys", the "limitation display method" is "none", and the "synthetic data" is "none".

For example, in a case where the vehicle state determination unit 206 extracts the "display part A", and the display of the "display part A" is limited, when the line 405 is read out, the "limitation region" is the "rectangular region (x1, y1)-(x2, y2)", the "limitation method" is the "superposition", and the "synthetic data" used for the superposition is the "image data A". The "rectangular region (x1, y1)-(x2, y2)" represents a rectangular region in which coordinates (x1, y1) and coordinates (x2, y2) of display of the mobile phone are apexes of opposite angles. In this case, the vehicle state determination unit 206 instructs the output limitation unit 205 to superimpose the "image data A" on the "rectangular region (x1, y1)-(x2, y2)" of the display of the mobile phone 103 for displaying, and to limit the display of the mobile phone 103 to the display device 111 of the in-vehicle device 101.

In a case where the display of the "display part B" is limited, when the line 406 and the line 407 are read out, the "limitation regions" are the "rectangular region (x3, y3)-(x4, y4)" and the "rectangular region (x5, y5)-(x6, y6)". The "limitation display method" of the "rectangular region (x3, y3)-(x4, y4)" is the "superposition", and the "synthetic data" is the "image data B", while the "limitation display method" of the "rectangular region (x5, y5)-(x6, y6)" is the "superposition", and the "synthetic data" is the "gray".

In a case where the display of the "display part C" is limited, when the line 408 is read out, the "limitation region" is the "rectangular region (x7, y7)-(x8, y8)", the "limitation display method" is the "superposition", and the "synthetic data" is the "gray". In this case, a "gray" rectangle is superimposed on the "rectangular region (x7, y7)-(x8, y8)" in the display of the mobile phone 103 for displaying, and the display of the mobile phone 103 to the display device 111 of the in-vehicle device 101 is limited.

In a case where the input of the "input part a" is limited, when the line 409 is read out, the "limitation region" is the "rectangular region (x5, y5)-(x6, y6)" In this case, the vehicle state determination unit 206 instructs the input limitation unit 204 not to output the input to the "rectangular region (x5, y5)-(x6, y6)" to the in-vehicle device vehicle-interior communication control unit 209.

In a case where the input of the "input part b" is limited, when the line 410 and the line 411 are read out, the "limitation regions" are the "rectangular region (x7, y7)-(x8, y8)" and the "selection key". In this case, the vehicle state determination unit 206 instructs the input limitation unit 204 not to output the input of the "rectangular region (x7, y7)-(x8, y8)" and the "selection key" to the in-vehicle device vehicle-interior communication control unit 209.

In a case where the display of the "full screen A" is limited, when the line 412 is read out, the "limitation region" is the "full screen region", the "limitation display methods" are the "reduced size ⅕ display", and the "in-vehicle device screen for reduced size ⅕ and mobile phone screen for reduced size ⅕". The "reduced size ⅕ display" means that the whole display of the mobile phone 103 is reduced in size to ⅕, and superimposed on the screen of the in-vehicle device for displaying. In this case, the vehicle state determination unit 206 instructs the in-vehicle device input/output switching unit 202 to process the display data of the in-vehicle device application unit 201 to the in-vehicle device screen for reduced size ⅕, to reduce the display data of the mobile phone 103 received from the in-vehicle device vehicle-interior communication control unit 209 to ⅕, and to pass the same to the output limitation unit 205. Furthermore, the vehicle state determination unit 206 instructs the output limitation unit 205 to superimpose the display data of the mobile phone 103, which is reduced in size to ⅕ and received from the in-vehicle device input/output switching unit 202 on the display data of the in-vehicle device application unit 201, which is processed to the in-vehicle device screen for reduced size ⅕, to pass the same to the in-vehicle device display control unit 208 for displaying.

In a case where the display of the "full screen B" is limited, when the line 413 is read out, the "limitation region" is the "full screen region", the "limitation display method" is the "icon display", and the "synthetic data" is the "in-vehicle device screen for icon and icon data". The "icon display" means that the display of the mobile phone 103 is not performed, and the "icon data" of the application run by the mobile phone 103 is superimposed on the screen of the in-vehicle device. In this case, the vehicle state determination unit 206 passes the icon data to the in-vehicle device input/output switching unit 202, and instructs the in-vehicle device input/output switching unit 202 to process the display data of the in-vehicle device application unit 201 to the in-vehicle device screen for icon, and to pass the same together with the icon data to the output limitation unit 205. Furthermore, the vehicle state determination unit 206 instructs the output limitation unit 205 to superimpose the icon data on the display data of the in-vehicle device application unit 201, which is processed to the in-vehicle device screen for icon received from the in-vehicle device input/output switching unit 202, and to pass the same to the in-vehicle device display control unit 208 for displaying.

In a case where the display of the "full screen C" is limited, when the line 414 is read out, the "limitation region" is the "full screen region", the "limitation display method" is the "in-vehicle device screen display", and the "synthetic data" is the "in-vehicle device screen". The "in-vehicle device screen display" means that the display of the mobile phone 103 is not performed, and the screen of the application run by the mobile phone 103 is displayed. In this case, the vehicle state determination unit 206 instructs the in-vehicle device input/output switching unit 202 to pass the display data of the in-vehicle device application unit 201 to the output limitation unit 205. Furthermore, the vehicle state determination unit 206 instructs the output limitation unit 205 to pass the display data of the in-vehicle device application unit 201 received from the in-vehicle device input/output switching unit 202 to the in-vehicle device display control unit 208 for displaying.

In a case where the "all input" is limited, when the line 415 is read out, the "limitation region" is the "full screen region and all keys". In this case, the vehicle state determination unit 206 instructs the input limitation unit 204 not to output all input to the in-vehicle device vehicle-interior communication control unit 209.

Figure 6:
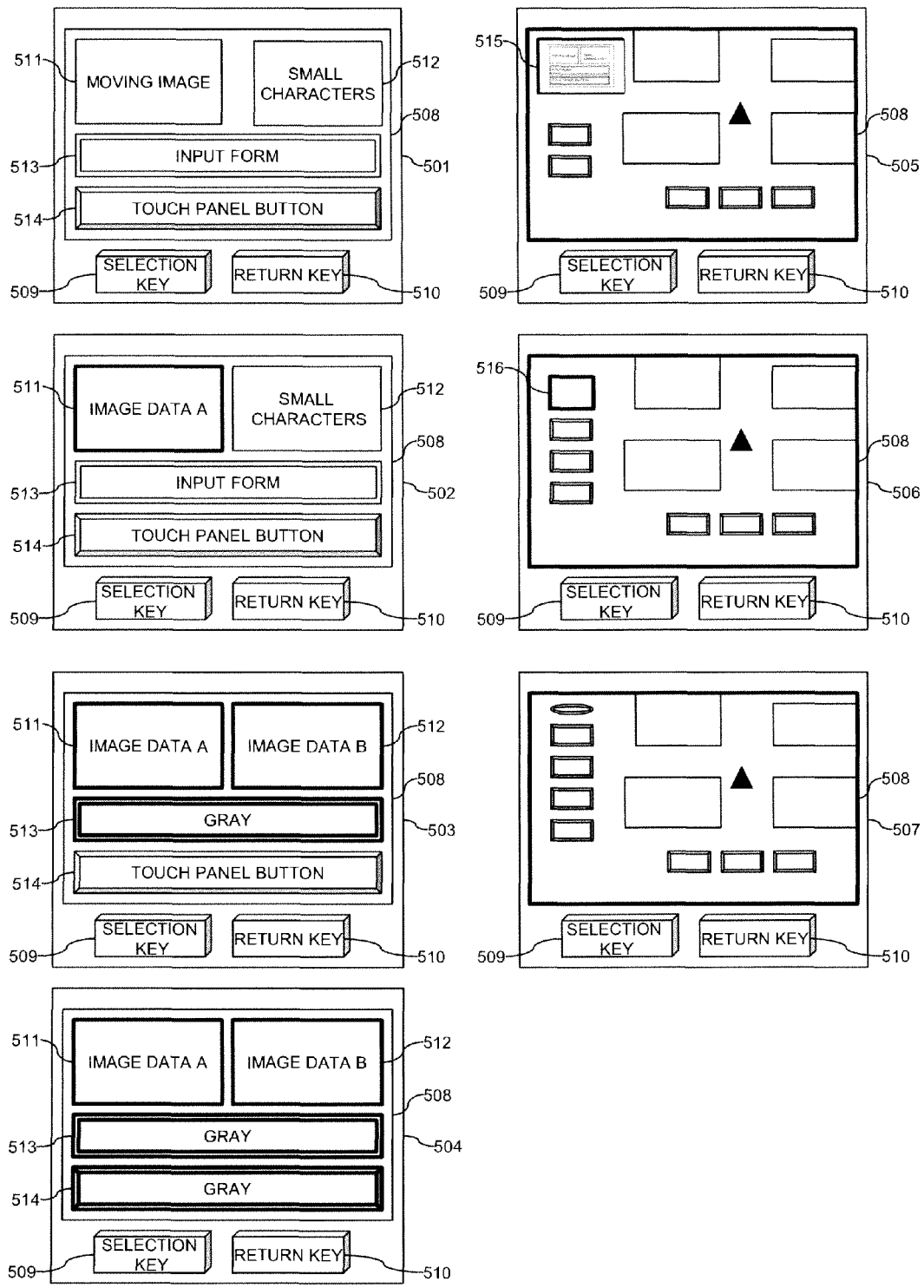
FIG. 6 is a figure showing an example of a screen where display and operation are limited when an application of a mobile phone is remote-controlled with the in-vehicle device.

FIG. 6 is an example of a screen in which display and operation are limited during the application of the mobile phone is remote-controlled with the in-vehicle device.

Reference numeral 501 denotes an example of a screen of a certain application in a case where the parking brake is ON, and the vehicle speed is 0 km/h. Reference numeral 502 denotes an example of a screen of the application in a case where the parking brake is OFF, and the vehicle speed is 0 km/h. Reference numeral 503 denotes an example of a screen of the application in a case where the parking brake is OFF, and the vehicle speed exceeds 0 km/h and is 20 km/h or less. Reference numeral 504 denotes an example of a screen of the application in a case where the parking brake is OFF, and the vehicle speed exceeds 20 km/h and is 30 km/h or less. Reference numeral 505 denotes an example of a screen of the application in a case where the parking brake is OFF, and the vehicle speed exceeds 30 km/h and is 40 km/h or less. Reference numeral 506 denotes an example of a screen of the application in a case where the parking brake is OFF, and the vehicle speed exceeds 40 km/h and is 50 km/h or less. Reference numeral 507 denotes an example of a screen of the application in a case where the parking brake is OFF, and the vehicle speed exceeds 50 km/h.

Reference numeral 508 denotes a full screen region of the display device 111 included in the in-vehicle device 101. Reference numeral 509 denotes a selection key of the input device 110 included in the in-vehicle device 101. Reference numeral 510 denotes a return key of the input device 110 included in the in-vehicle device 101. Reference numeral 511 denotes a rectangular region (x1, y1)-(x2, y2) of the display device 111 included in the in-vehicle device 101. Reference numeral 512 denotes a rectangular region (x3, y3)-(x4, y4) of the display device 111 included in the in-vehicle device 101. Reference numeral 513 denotes a rectangular region (x5, y5)-(x6, y6) of the display device 111 included in the in-vehicle device 101. Reference numeral 514 denotes a rectangular region (x7, y7)-(x8, y8) of the display device 111 included in the in-vehicle device 101. Reference numeral 515 denotes a display region of a mobile phone screen reduced in size to ⅕ of the display device 111 included in the in-vehicle device 101. Reference numeral 516 denotes a display region of a mobile phone application icon of the display device 111 included in the in-vehicle device 101.

In the case where the parking brake is ON, and the vehicle speed is 0 km/h, only the conditions of the line 305 of the table of FIG. 4 are met, and hence the vehicle state determination unit 206 extracts "none" as the "display limitation part" and "none" as the "operation limitation part" from the table of FIG. 4. Since the "display limitation part" is "none", and hence the vehicle state determination unit 206 instructs the in-vehicle device input/output switching unit 202 to pass the input received from the in-vehicle device input control unit 207 to the input limitation unit 204 without any change, and to pass the display data of the mobile phone 103 received from the in-vehicle device vehicle-interior communication control unit 209 to the output limitation unit 205 without any change. Furthermore, the vehicle state determination unit 206 instructs the input limitation unit 204 to pass the input received from the in-vehicle device input/output switching unit 202 to the mobile phone 103 through the in-vehicle device vehicle-interior communication control unit 209 without any change, and instructs the output limitation unit 205 to pass the display data of the mobile phone 103 received from the in-vehicle device input/output switching unit 202 to the in-vehicle device display control unit 208 without any change, and to display the same on the display device 111 of the in-vehicle device 101. Therefore, a screen of the example 501 of the screen in the case where the parking brake is ON, and the vehicle speed is 0 km/h is the same display as the screen of the mobile phone application unit 210 of the mobile phone 103, and operation to any region of the screen is transmitted to the mobile phone 103.

In the case where the parking brake is OFF, and the vehicle speed is 0 km/h, only the conditions of the line 306 of the table of FIG. 4 are met, and hence the vehicle state determination unit 206 extracts the "display part A" as the "display limitation part" and "none" as the "operation limitation part" from the table of FIG. 4. Then, the line 405, the "part" of which is the "display part A", is extracted from the table of FIG. 5, and the "limitation region" is the "rectangular region (x1, y1)-(x2, y2)", the "limitation method" is the "superposition", the "synthetic data" used for the superposition is the "image data A". The "rectangular region (x1, y1)-(x2, y2)" represents a rectangular region in which coordinates (x1, y1) and coordinates (x2, y2) in the screen of the mobile phone 103 are apexes of opposite angles. In this case, the vehicle state determination unit 206 instructs the output limitation unit 205 to superimpose the "image data A" on the "rectangular region (x1, y1)-(x2, y2)" of the screen of the mobile phone 103 for displaying, and to limit the display of the mobile phone 103 to the display device 111 of the in-vehicle device 101. Therefore, in the example 502 of the screen in the case where the parking brake is OFF, and the vehicle speed is 0 km/h, the image data A of the display of the mobile phone application unit 210 of the mobile phone 103 is displayed on the rectangular region (x1, y1)-(x2, y2) 511. However, operation to any region of the screen is transmitted to the mobile phone 103.

In the case where the parking brake is OFF, and the vehicle speed exceeds 0 km/h and is 20 km/h or less, only the conditions of the line 306 and the line 307 of the table of FIG. 4 are met, and hence the vehicle state determination unit 206 extracts the "display part A" and the "display part B" as the "display limitation part", and "none" and the "input part a" as the "operation limitation part" from the table of FIG. 4. Then, the line 405, the line 406, the line 407 and the line 409, the "parts" of which are the "display part A", the "display part B", and the "input part a", are extracted from the table of FIG. 5. The vehicle state determination unit 206 instructs the output limitation unit 205 to limit the display of the rectangular region (x1, y1)-(x2, y2) 511, the rectangular region (x3, y3)-(x4, y4) 512, and the rectangular region (x5, y5)-(x6, y6) 513. Furthermore, the vehicle state determination unit 206 instructs the input limitation unit 204 to limit the input of the rectangular region (x5, y5)-(x6, y6) 513. Therefore, in the example 503 of the screen in the case where the parking brake is OFF, and the vehicle speed exceeds 0 km/h and is 20 km/h or less, of the display of the mobile phone application unit 210 of the mobile phone 103, the image data A is displayed on the rectangular region (x1, y1)-(x2, y2) 511, the image data B is displayed on the rectangular region (x3, y3)-(x4, y4) 512, the gray rectangle is displayed on the rectangular region (x5, y5)-(x6, y6) 513, and the input to the rectangular region (x5, y5)-(x6, y6) 513 is not transmitted to the mobile phone 103.

In the case where the parking brake is OFF, and the vehicle speed exceeds 20 km/h and is 30 km/h or less, the conditions of the line 306, the line 307 and the line 308 of the table of FIG. 4 are met, and hence the vehicle state determination unit 206 extracts the "display part A", the "display part B", and the "display part C" as the "display limitation part", and "none" and the "input part a" and the "input part b" as the "operation limitation part" from the table of FIG. 4. Furthermore, the line 405, the line 406, the line 407, the line 408, the line 409, the line 410 and the line 411, the "parts" of which are the "display part A", the "display part B", the "display part C", the "input part a" and the "input part b", are extracted from the table of FIG. 5. Then, the vehicle state determination unit 206 instructs the output limitation unit 205 to limit the display of the rectangular region (x1, y1)-(x2, y2) 511, the rectangular region (x3, y3)-(x4, y4) 512, the rectangular region (x5, y5)-(x6, y6) 513, and the rectangular region (x7, y7)-(x8, y8) 514. Furthermore, the vehicle state determination unit 206 instructs the input limitation unit 204 to limit the input of the rectangular region (x5, y5)-(x6, y6) 513, the rectangular region (x7, y7)-(x8, y8) 514, and the selection key. Therefore, in the example 504 of the screen in the case where the parking brake is OFF, and the vehicle speed exceeds 20 km/h and is 30 km/h or less, of the display of the mobile phone application unit 210 of the mobile phone 103, the image data A is displayed on the rectangular region (x1, y1)-(x2, y2) 511, the image data B is displayed on the rectangular region (x3, y3)-(x4, y4) 512, the gray rectangle is displayed on the rectangular region (x5, y5)-(x6, y6) 513, the gray rectangle is displayed on the rectangular region (x7, y7)-(x8, y8) 514, and the input to the rectangular region (x5, y5)-(x6, y6) 513, the rectangular region (x7, y7)-(x8, y8) 514, and the selection key is not transmitted to the mobile phone 103.

In the case where the parking brake is OFF, and the vehicle speed exceeds 30 km/h and is 40 km/h or less, only the conditions of the line 309 of the table of FIG. 4 are met, and hence the vehicle state determination unit 206 extracts the "full screen A" as the "display limitation part", and the "all input" as the "operation limitation part" from the table of FIG. 4. Furthermore, the line 412 and the line 415, the "parts" of which are the "full screen A" and "all input" are extracted from the table of FIG. 5. Then, the vehicle state determination unit 206 instructs the in-vehicle device input/output switching unit 202 to process the display data of the in-vehicle device application unit 201 to the in-vehicle device screen for reduced size ⅕, to reduce the display data of the mobile phone 103 received from the in-vehicle device vehicle-interior communication control unit 209 to ⅕, and to pass the same to the output limitation unit 205. Furthermore, the vehicle state determination unit 206 instructs the output limitation unit 205 to superimpose the display data of the mobile phone 103, which is reduced in size to ⅕ and received from the in-vehicle device input/output switching unit 202, on the display data of the in-vehicle device application unit 201, which is processed to the in-vehicle device screen for reduced size ⅕, and to pass the same to the in-vehicle device display control unit 208 for displaying, and instructs the input limitation unit 204 not to output all of the input to the in-vehicle device vehicle-interior communication control unit 209. Therefore, in the example 505 of the screen in the case where the parking brake is OFF, and the vehicle speed exceeds 30 km/h and is 40 km/h or less, the in-vehicle device screen for reduced size ⅕ is displayed on the full screen region 508 of the display device 111 of the in-vehicle device 101, and the display data of the mobile phone 103, which is reduced in size to ⅕, is displayed on the display region 515 of the mobile phone screen for reduced size ⅕, and all of the input is not transmitted to the mobile phone 103.

In the case where the parking brake is OFF, and the vehicle speed exceeds 40 km/h and is 50 km/h or less, only the conditions of the line 310 of the table of FIG. 4 are met, and hence the vehicle state determination unit 206 extracts the "full screen B" as the "display limitation part", and the "all input" as the "operation limitation part" from the table of FIG. 4. Furthermore, the line 413 and the line 415, the "parts" of which are the "full screen B" and the "all input" are extracted from the table of FIG. 5. Then, the vehicle state determination unit 206 passes the icon data to the in-vehicle device input/output switching unit 202, and instructs the in-vehicle device input/output switching unit 202 to process the display data of the in-vehicle device application unit 201 to the in-vehicle device screen for icon, and to pass the same together with the icon data to the output limitation unit 205. Furthermore, the vehicle state determination unit 206 instructs the output limitation unit 205 to superimpose the icon data on the display data of the in-vehicle device application unit 201, which is processed to the in-vehicle device screen for icon received from the in-vehicle device input/output switching unit 202, and to pass the same to the in-vehicle device display control unit 208 for displaying. Moreover, the vehicle state determination unit 206 instructs the input limitation unit 204 not to output all of the input to the in-vehicle device vehicle-interior communication control unit 209. Therefore, in the example 506 of the screen in the case where the parking brake is OFF, and the vehicle speed exceeds 40 km/h and is 50 km/h or less, the in-vehicle device screen for icon is displayed on the full screen region 508 of the display device 111 of the in-vehicle device 101, and the icon is displayed on the display region 516 of the mobile phone application icon, and all of the input is not transmitted to the mobile phone 103.

In the case where the parking brake is OFF, and the vehicle speed exceeds 50 km/h, only the conditions of the line 311 of the table of FIG. 4 are met, and hence the vehicle state determination unit 206 extracts the "full screen C" as the "display limitation part", and "all input" as the "operation limitation part" from the table of FIG. 4. Furthermore, the vehicle state determination unit 206 extracts the line 414 and the line 415, the "parts" of which are the "full screen C" and the "all input", from the table of FIG. 5. Then, the vehicle state determination unit 206 instructs the in-vehicle device input/output switching unit 202 to pass the display data of the in-vehicle device application unit 201 to the output limitation unit 205, instructs the output limitation unit 205 to pass the display data of the in-vehicle device application unit 201, which is received from the in-vehicle device input/output switching unit 202, to the in-vehicle device display control unit 208 for displaying, and instructs the input limitation unit 204 not to output all of the input to the in-vehicle device vehicle-interior communication control unit 209. Therefore, in the example 507 of the screen in the case where the parking brake is OFF, and the vehicle speed exceeds 50 km/h, the in-vehicle device screen is displayed on the full screen region 508 of the display device 111 of the in-vehicle device 101, and all of the input is not transmitted to the mobile phone 103.

FIG. 7 is a figure showing an example of a table for managing limitation conditions of display and operation according to a predetermined vehicle state. A configuration thereof is similar to that of the table of the limitation condition information of FIG. 4. Configurations denoted by the same reference numerals as those shown in FIG. 4, which are already described, and portions having the same functions are not repeatedly described.

On a line 601, it is described that in a case where the "parking brake state" is "ON", and the "vehicle speed" is "vehicle speed=0 km/h", the "display limitation part" is "none", and the "operation limitation part" is "none". On a line 602, it is described that in a case where the "parking brake state" is "OFF", and the "vehicle speed" is "vehicle speed=0 km/h", the "display limitation part" is a "display part B", and the "operation limitation part" is "all input". On a line 603, it is described that in a case where the "parking brake state" is "OFF", and the "vehicle speed" is "0 km/h<vehicle speed", the "display limitation part" is a "display part C", and the "operation limitation part" is "all input".

Thus, it is possible to correspond to various applications for general purposes without being influenced by the display contents of the applications of the mobile phone by setting an item entered in the "display limitation part" as "none" or the limitation parts to the whole display of the mobile phone 103, and setting an item entered in the "operation limitation part" as "none" or the parts to all input.

FIG. 8 is a figure showing a configuration of a table for managing limitation parts of predetermined display and operation, and a limitation method. The configuration thereof is similar to that of the table of the limitation method information of FIG. 5. Configurations denoted by the same reference numerals as those shown in FIG. 5, which are already described, and portions having the same functions are not repeatedly described.

On a line 701, it is described that in a case where the "part" is the "full screen B", the "limitation region" is the "full screen region", the "limitation display method" is the "icon display", and the "synthetic data" is the "in-vehicle device screen for icon and icon data". On a line 702, it is described that in a case where the selected "part" is "full screen C", the "limitation region" is the "full screen region", the "limitation display method" is the "in-vehicle device screen display", and the "synthetic data" is the "in-vehicle device screen". On a line 703, it is described that in a case where the selected "part" is the "all input", the "limitation region" is the "full screen region and all keys", the "limitation display method" is "none", and the "synthetic data" is "none".

As in the table of FIG. 8, it is determined that the "full screen B" and the "full screen C" used in FIG. 7 are limitation parts to the whole display of the mobile phone 103, and it is determined that the "all input" is a method of not transmitting all of the input to the mobile phone 103, thereby enabling input and output to be limited to various applications for general purposes without being influenced by the display contents of the applications of the mobile phone.

FIG. 9 shows an example of a configuration of a table for managing input/output limitation information delivered from the server.

An "in-vehicle device model ID" 801 is an ID inherent in the model of the in-vehicle device. A "mobile phone app ID" 802 is an ID inherent in the individual application run by the mobile phone 103. An "input/output limitation information" 803 is input/output limitation information delivered by the server 105, and has the same configuration as the input/output limitation information 216.

On a line 804, it is described that "input/output limitation information" delivered in a case where the "in-vehicle device model ID" is an "in-vehicle device A", and the "mobile phone app ID" is a "mobile phone app a" is "input/output limitation information Aa". On a line 805, it is described that "input/output limitation information" delivered in a case where the "in-vehicle device model ID" is an "in-vehicle device A", and the "mobile phone app ID" is a "mobile phone app b" is "input/output limitation information Ab". On a line 806, it is described that "input/output limitation information" delivered in a case where the "in-vehicle device model ID" is an "in-vehicle device B", and the "mobile phone app ID" is the "mobile phone app a" is "input/output limitation information Ba". On a line 807, it is described that "input/output limitation information" delivered in a case where the "in-vehicle device model ID" is the "in-vehicle device B", and the "mobile phone app ID" is the "mobile phone app b" is "input/output limitation information Bb".

Figure 10:
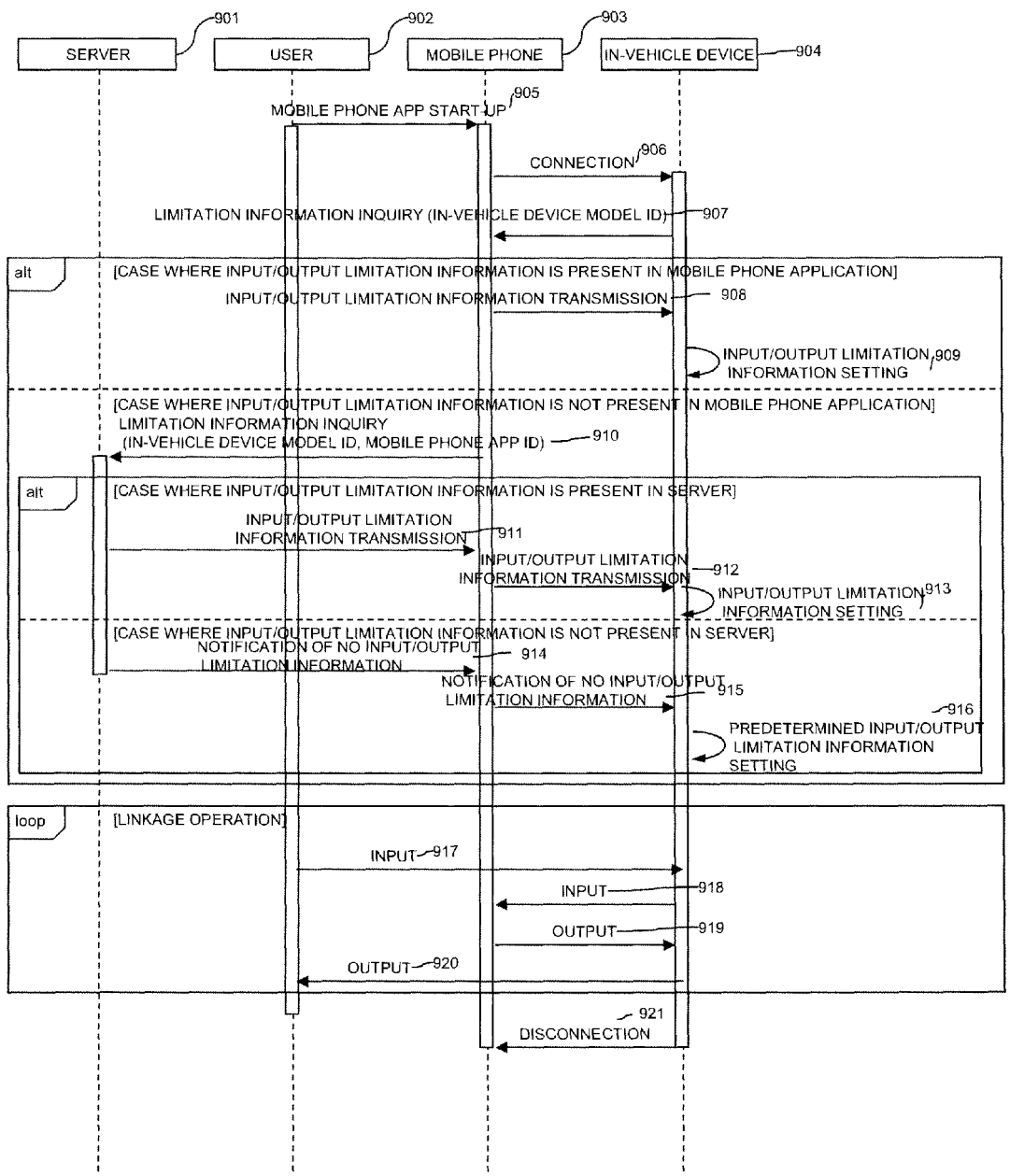
FIG. 10 is an example of sequence activating such that the application of the mobile phone is remote-controlled with the in-vehicle device.

FIG. 10 is an example of sequence activating such that the application of the mobile phone is remote-controlled with the in-vehicle device.

Here, reference numeral 901 denotes a server, reference numeral 902 denotes a user, reference numeral 903 denotes a mobile phone, and reference numeral 904 denotes an in-vehicle device.

First, the user 902 make an instruction of mobile phone app start-up 905 to the mobile phone 903. The mobile phone 903 makes connection 906 to the in-vehicle device 904. The in-vehicle device 904 makes a limitation information inquiry (in-vehicle device model ID) 907 to the mobile phone 903, and passes the in-vehicle device model ID to the mobile phone 903.

A case where an in-vehicle device model ID list of the compatible in-vehicle device information 219 of the input/output limitation information 216 of the in-vehicle device application unit 201 includes the in-vehicle device model ID of the limitation information inquiry (in-vehicle device model ID) 907, and input/output limitation information suitable for the in-vehicle device 904 exists will be considered.

First, input/output limitation information transmission 908 is performed to the in-vehicle device 904, and the input/output limitation information 216 is passed to the in-vehicle device 904.

The in-vehicle device 904 performs input/output limitation information setting 909. That is, the input/output limitation information 216 received by the in-vehicle device vehicle-interior communication control unit 209 is passed to the input/output limitation information storage unit 203, and is written in the input/output limitation information region 221.

In a case where the in-vehicle device model ID list of the compatible in-vehicle device information 219 of the input/output limitation information 216 of the in-vehicle device application unit 201 does not include the in-vehicle device model ID of the limitation information inquiry (in-vehicle device model ID) 907, and the input/output limitation information suitable for the in-vehicle device 904 does not exist, the mobile phone 903 makes a limitation information inquiry (an in-vehicle device model ID and a mobile phone app ID) 910 to the server 901, and the in-vehicle device model ID and the mobile phone app ID are passed to the server 901.

In a case where the combination of the in-vehicle device model ID and the mobile phone app ID received by the server 901 exists in the input/output limitation information management table, and input/output limitation information suitable for the combination of the applications run by the in-vehicle device 904 and the mobile phone 903 exists in the server 901, the delivery unit 222 extracts the input/output limitation information from the input/output limitation information management table 223, performs input/output limitation information transmission 911 to the mobile phone 903, and passes the input/output limitation information 216 to the mobile phone 903.

The mobile phone 903 performs input/output limitation information transmission 912, and passes the input/output limitation information 216 received from the server 901 to the in-vehicle device 904.

The in-vehicle device 904 performs input/output limitation information setting 913, and writes the input/output limitation information 216 received from the server 901 in the input/output limitation information region 221.

In a case where the combination of the in-vehicle device model ID and the mobile phone app ID received by the server 901 does not exist in the input/output limitation information management table, and input/output limitation information suitable for the combination of the applications run by the in-vehicle device 904 and the mobile phone 903 does not exist in the server 901, the server 901 sends a notification of no input/output limitation information 914 to the mobile phone 903.

The mobile phone 903 sends a notification of no input/output limitation information 915 to the in-vehicle device 904. The in-vehicle device 904 performs predetermined input/output limitation information setting 916. The input/output limitation information storage unit 203, which receives the notification of no input/output limitation information through the in-vehicle device vehicle-interior communication control unit 209, writes the contents of the predetermined input/output limitation information 220 in the input/output limitation information region 221.

During linkage operation, input 917 from the user 902 to the in-vehicle device 904, input 918 from the in-vehicle device 904 to the mobile phone 903, output 919 from the mobile phone 903 to the in-vehicle device 904, output 920 from the in-vehicle device 904 to the user 902 are repeated. At this time, the vehicle state determination unit 206 acquires a vehicle state from the vehicle state sensor 102, performs control of the in-vehicle device input/output switching unit 202, the input limitation unit 204, and the output limitation unit 205 in accordance with the input/output limitation information 216 or the predetermined input/output limitation information 220, which is written in a input/output limitation information storage region, controls whether or not the input 917 received by the in-vehicle device input control unit 207 is passes to the mobile phone 903 as the input 918 through the in-vehicle device vehicle-interior communication control unit 209, processes display data of the output 919 received by the in-vehicle device vehicle-interior communication control unit 209, displays the same on the display device 111 through the in-vehicle device display control unit 208, and passes the same as the output 920 to the user 902.

Finally, disconnection 921 is notified by the in-vehicle device 904 to the mobile phone 903, and remote control of the mobile phone 903 by the in-vehicle device 904 is terminated.

Figure 11:
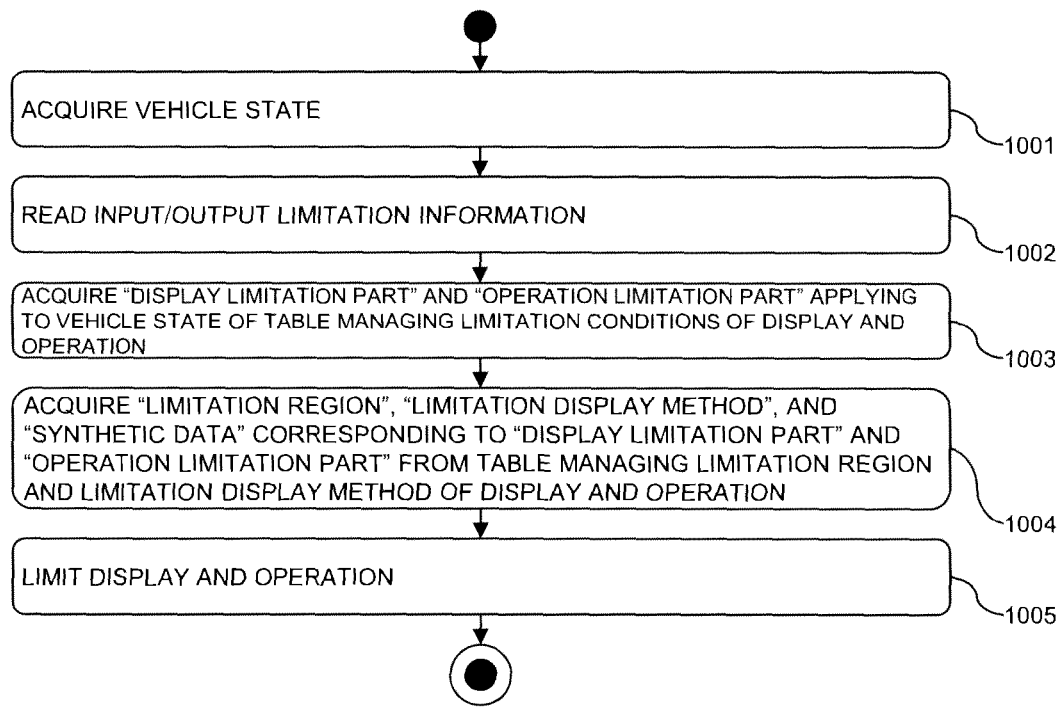
FIG. 11 is a flowchart showing an operation example of a vehicle state determination unit.

FIG. 11 is an example of a flow of a vehicle state determination unit.

First, the vehicle state determination unit 206 acquires a vehicle state with the vehicle state sensor 102 in Step 1001. In Step 1002, the input/output limitation information storage unit 203 reads in input/output limitation information stored in the input/output limitation information region 221. In Step 1003, the vehicle state determination unit 206 acquires a "display limitation part" and a "operation limitation part" applied to the vehicle state, which are acquired from the table (FIG. 4 or FIG. 7) for managing the limitation conditions of display and operation in Step 1001.

In Step 1004, a "limitation region", a "limitation display method" and "synthetic data" corresponding to the "display limitation part" and the "operation limitation part" acquired in Step 1003 are acquired from the table (FIG. 5 or FIG. 8) for managing the limitation region of display and operation and the limitation display method.

In Step 1005, in accordance with the "limitation region", the "limitation display method" and the "synthetic data" acquired in Step 1004, the in-vehicle device input/output switching unit 202, the input limitation unit 204, and the output limitation unit 205 are controlled to limit display and operation.

According to the present practical example, in a case where display or operation is performed with the in-vehicle device 101 even when the parking brake is OFF, the application on the mobile phone 103 previously holds the input/output limitation information 216 for limitation according to the vehicle state. Before start of the display of the application with the in-vehicle device 101, the in-vehicle device 101 acquires the input/output limitation information 216 from the application, and changes transmission ranges of display and operation according to the vehicle state.

According to the present practical example, in order to address a case where the application on the mobile phone 103 previously does not have the input/output limitation information, the input/output limitation information is held in the server 105 of a center. Before the start of the display of the application with the in-vehicle device 101, the in-vehicle device 101 acquires the input/output limitation information from the center, and changes the transmission ranges of display and operation according to the vehicle state.

According to an aspect of the present practical example, in a case where an input/output device of the in-vehicle device is used, and the application of the mobile phone is utilized, in various combinations of the in-vehicle device and the mobile phone, active and inactive of display and operation of the general-purpose application of the mobile phone by the in-vehicle device 101 can be controlled according to the vehicle state. Furthermore, a method of controlling active and inactive of operation and the screen of the in-vehicle device 101 can be changed for each application by changing the input/output limitation information of the center, and various applications can be safely utilized.

According to an aspect of the present practical example, when the display or the operation of the application with the in-vehicle device 101 is started, the input/output limitation information is incorporated in the in-vehicle device 101, and hence the user can easily apply limitation information easily enabling safe display or operation by preparing the mobile phone 103 serving as a control target device and the in-vehicle device 101 serving as a control instruction device, even in a case of utilizing a new mobile phone 103 or a new application with the in-vehicle device 101.

The aforementioned embodiment and practical example of the present invention are exemplification for explanation of the present invention, and the scope of the present invention is not limited to these embodiment and practical example. A person in skilled in the art can practice the present invention in various aspects without departing the spirit and scope of the present invention.

For example, while the region where operation is limited is displayed in gray in the present practical example, the present invention is not limited to this. The region where operation is limited may be displayed in color other than gray. Alternatively, the region may be configured that the user can set the color to be displayed.

What is claimed is:

1. An in-vehicle device installed in a vehicle, connected to a terminal device, and configured to enable operation and display of an application running on the terminal device, the in-vehicle device comprising:
   an input control unit configured to detect operation input;
   an output control unit configured to control display output;
   a communication control unit configured to receive display output from the terminal device connected, and transmit operation input to the terminal device;
   an input/output limitation information storage unit configured to store input/output limitation information in which limitation processing for limiting operation input to the application and display output from the application is prescribed by associating the limitation processing with the application;
   a determination unit configured to acquire a vehicle state of the vehicle, and determine the limitation processing to be applied to the operation input to the application and the display output from the application on a basis of the application running on the terminal device, the vehicle state, and the input/output limitation information; and
   a limitation unit configured to perform the limitation processing determined by the determination unit for the operation input detected by the input control unit and transmitted to the communication control unit, and the display output received by the communication control unit and transmitted to the output control unit,
   wherein the input/output limitation information includes first input/output limitation information in which limitation processing with respect to a combination of a specific application running on the terminal device and a model of a specific in-vehicle device is prescribed, and
   the input/output limitation information includes second input/output limitation information to be applied to a combination of an application and a model of an in-vehicle device, which is not prescribed in the first input/output limitation information,
   wherein the determination unit is configured to determine limitation processing for the application on a basis of the first input/output limitation information when a combination of the application running on the terminal device and the in-vehicle device itself is prescribed in the first input/output limitation information,
   wherein the determination unit is configured to determine the limitation processing for the application on a basis of the second input/output limitation information when the combination of the application and the in-vehicle device itself is not prescribed in the first input/output limitation information, and
   wherein the communication control unit is configured to notify the terminal device of identification information identifying the model of the in-vehicle device itself when connected to the terminal device, acquire first input/output limitation information corresponding to the combination of the application running on the terminal device and the in-vehicle device from the terminal device, and record the first input/output limitation information in the input/output limitation information storage unit.

2. A method of controlling an in-vehicle device having an input control unit configured to detect operation input, an output control unit configured to control display output, and a communication control unit connected to a terminal device, and configured to enable operation and display of an application running on the terminal device, the method of controlling an in-vehicle device comprising:
   storing, in an input/output limitation information storage unit, input/output limitation information in which limitation processing for limiting operation input to the application and display output from the application is prescribed by associating the limitation processing with the application;
   acquiring, through a determination unit, a vehicle state of the vehicle;
   determining, through the determination unit, the limitation processing to be applied to the operation input to the application and the display output from the application on a basis of the application running on the terminal device, the vehicle state, and the input/output limitation information;
   performing, through a limitation unit, the limitation processing determined by the determination unit for the operation input detected by the input control unit and transmitted to the communication control unit, and the display output received by the communication control unit and transmitted to the output control unit,
   wherein the input/output limitation information includes first input/output limitation information in which limitation processing with respect to a combination of a specific application running on the terminal device and a model of a specific in-vehicle device is prescribed, and
   the input/output limitation information includes second input/output limitation information to be applied to a combination of an application and a model of an in-vehicle device, which is not prescribed in the first input/output limitation information;
   determining, by the determination unit, the limitation processing for the application on a basis of the first input/output limitation information when a combination of the application running on the terminal device and the in-vehicle device itself is prescribed in the first input/output limitation information;
   determining, by the determination unit, the limitation processing for the application on a basis of the second input/output limitation information when the combination of the application and the in-vehicle device itself is not prescribed in the first input/output limitation information; and
   notifying, through the communication control unit, the terminal device of identification information identifying the model of the in-vehicle device itself when connected to the terminal device;
   acquiring, through the communication control unit, first input/output limitation information corresponding to the combination of the application running on the terminal device and the in-vehicle device from the terminal device; and
   recording, through the communication control unit, the first input/output limitation information in the input/output limitation information storage unit.

3. A remote control system comprising:
   a terminal device configured to run an application; and
   an in-vehicle device having an input control unit configured to detect operation input, an output control unit configured to control display output, and a communication control unit connected to the terminal device, installed in a vehicle, configured to store input/output limitation information in which limitation processing for limiting operation input to the application and display output from the application is prescribed by associating the limitation processing with the application, detect a vehicle state of the vehicle, and perform the limitation processing, which is determined on the basis of the application running on the terminal device, the vehicle state, and the input/output limitation information, for the operation input detected by the input control unit and transmitted to the communication control unit, and the display output received by the communication control unit and transmitted to the output control unit, where the input/output limitation information includes first input/output limitation information in which limitation processing with respect to a combination of a specific application running on the terminal device and a model of a specific in-vehicle device is prescribed, and the input/output limitation information includes second input/output limitation information to be applied to a combination of an application and an in-vehicle device, which is not prescribed in the first input/output limitation information, wherein the in-vehicle device is configured to determine limitation processing for the application on the basis of the first input/output limitation information when a combination of the application running on the terminal device and a model of the in-vehicle device itself is prescribed in the first input/output limitation information, wherein the in-vehicle device is configured to determine the limitation processing for the application on the basis of the second input/output limitation information when the combination of the application and the model of the in-vehicle device itself is not prescribed in the first input/output limitation information, and wherein the in-vehicle device is configured to notify the terminal device of identification information identifying the model of the in-vehicle device itself when connected to the terminal device, acquire first input/output limitation information corresponding to the combination of the application running on the terminal device and the model of the in-vehicle device from the terminal device, and record the first input/output limitation information.

4. The remote control system according to claim 3, further comprising:

a server configured to hold input/output limitation information, in which limitation processing corresponding to a combination of the in-vehicle device and the application is prescribed, and connected to the terminal device through a network, wherein in a case where the terminal device does not hold the first input/output limitation information corresponding to the combination of the application running on the terminal device itself and the model of the in-vehicle device when the identification information of the in-vehicle device is notified, the terminal device is configured to notify the server of the identification information of the in-vehicle device and identification information of the application, acquire the input/output limitation information, in which the limitation processing corresponding to the combination of the in-vehicle device and the application is prescribed, and notify the in-vehicle device of the input/output limitation information as the first input/output limitation information.

* * * * *